United States Patent [19]

Awata et al.

[11] Patent Number: 5,471,507
[45] Date of Patent: Nov. 28, 1995

[54] CIRCUIT FOR DETECTING OBJECT SIGNAL FROM INPUT SIGNAL

[75] Inventors: Yutaka Awata; Mitsuo Kakuishi, both of Kawasaki, Japan

[73] Assignee: Fujitsu Limited, Kawasaki, Japan

[21] Appl. No.: 122,500

[22] PCT Filed: Jan. 28, 1993

[86] PCT No.: PCT/JP93/00100

§ 371 Date: Sep. 28, 1993

§ 102(e) Date: Sep. 28, 1993

[87] PCT Pub. No.: WO93/15580

PCT Pub. Date: May 8, 1993

[30] Foreign Application Priority Data

Jan. 29, 1992 [JP] Japan .................................. 4-014175

[51] Int. Cl.⁶ ................................................. H04L 27/06
[52] U.S. Cl. ........................ 375/340; 375/342; 375/343; 370/110.3
[58] Field of Search .................................. 375/94, 95, 96, 375/28, 116, 114; 364/424.09; 370/110.3

[56] References Cited

U.S. PATENT DOCUMENTS 4,032,885  6/1977  Roth ........................................... 375/96
4,309,772  1/1982  Kloker et al. ............................... 375/94
5,148,453  9/1992  Newby et al. ............................. 375/116
5,161,171  11/1992  Suzuki et al. ............................. 375/116
5,289,391  2/1994  Ibrahim et al. ............................. 375/94

FOREIGN PATENT DOCUMENTS 55-100774  7/1980  Japan .
4122152  4/1992  Japan .
4120840  4/1992  Japan .

Primary Examiner—Stephen Chin
Assistant Examiner—T. Ghebretinsae
Attorney, Agent, or Firm—Greer, Burns & Crain, Ltd.

[57] ABSTRACT

An input analog signal having a periodicity is converted into one-bit digital signals by an A/D converter (42), and the one-bit digital signals are converted into parallel signals by a serial-to-parallel converter (43). A correlation between the parallel signals and a reference signal string is detected by a correlation device (45). When the correlation is detected, a hold circuit (48) holds detection of the correlation and hence outputs a tone signal detection result. With the above simple, low power consumption circuit structure, the tone signal can be detected.

7 Claims, 8 Drawing Sheets

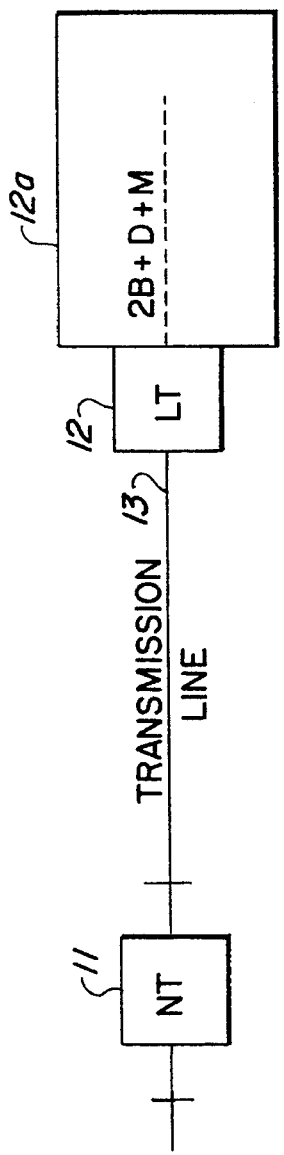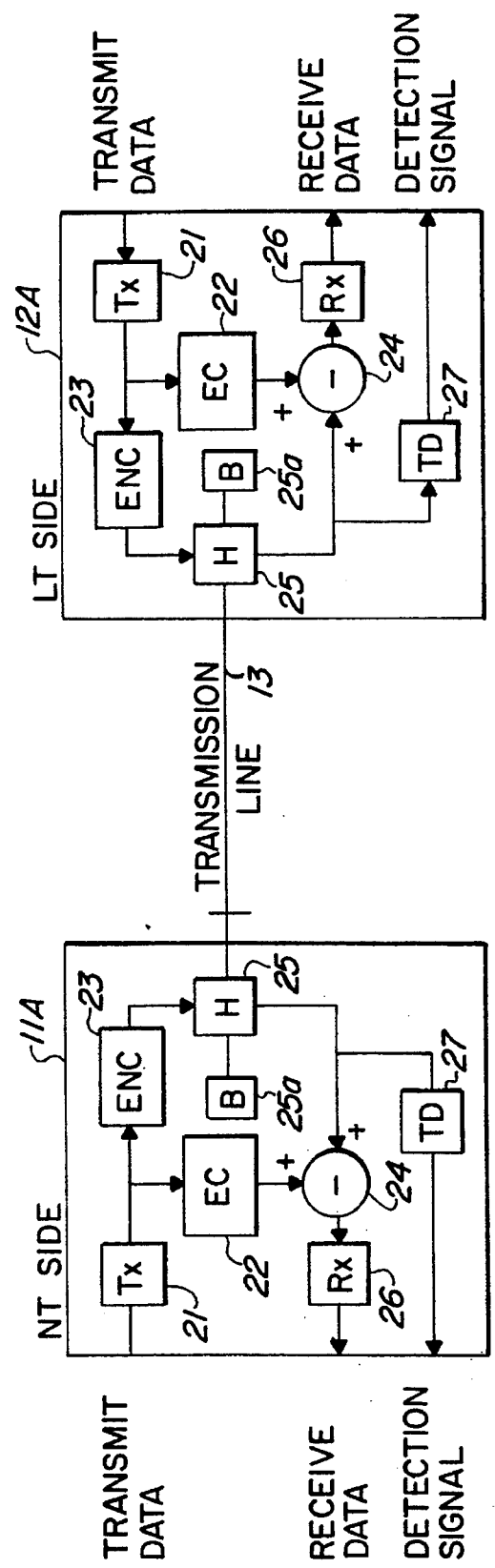

Fig. 12

45 CORRELATION DEVICE

$$A1 = Q1 \cdot Q2 \cdot Q3 \cdot Q4 \cdot Q5 \cdot \overline{Q7}$$
$$A2 = Q1 \cdot Q2 \cdot Q3 \cdot Q4 \cdot \overline{Q6} \cdot \overline{Q7}$$
$$A3 = Q1 \cdot Q2 \cdot Q3 \cdot \overline{Q5} \cdot \overline{Q6} \cdot \overline{Q7}$$
$$A4 = Q1 \cdot Q2 \cdot \overline{Q4} \cdot \overline{Q5} \cdot \overline{Q6} \cdot \overline{Q7}$$
$$A5 = Q1 \cdot \overline{Q3} \cdot \overline{Q4} \cdot \overline{Q5} \cdot \overline{Q6} \cdot \overline{Q7}$$

$$B1 = Q9 \cdot QA \cdot QB \cdot QC \cdot QD \cdot \overline{QF}$$
$$B2 = Q9 \cdot QA \cdot QB \cdot QC \cdot \overline{QE} \cdot \overline{QF}$$
$$B3 = Q9 \cdot QA \cdot QB \cdot \overline{QD} \cdot \overline{QE} \cdot \overline{QF}$$
$$B4 = Q9 \cdot QA \cdot \overline{QC} \cdot \overline{QD} \cdot \overline{QE} \cdot \overline{QF}$$
$$B5 = Q9 \cdot \overline{QB} \cdot \overline{QC} \cdot \overline{QD} \cdot \overline{QE} \cdot \overline{QF}$$

$$\left. \begin{array}{l} A1 \cdot B1 + A1 \cdot B2 \\ + A2 \cdot B1 + A2 \cdot B2 + A2 \cdot B3 \\ + A3 \cdot B2 + A3 \cdot B3 + A3 \cdot B4 \\ + A4 \cdot B3 + A4 \cdot B4 + A4 \cdot B5 \\ + A5 \cdot B4 + A5 \cdot B5 \end{array} \right\} Y$$

5,471,507

CIRCUIT FOR DETECTING OBJECT SIGNAL FROM INPUT SIGNAL

TECHNICAL FIELD

The present invention relates to signal detection circuits, and more particularly to a signal detection circuit for detecting a tone signal used in a digital subscriber transmission device, a modem or the like.

BACKGROUND ART

FIG. 1 is a diagram of the structure of a conventional digital subscriber line transmission system. In FIG. 1, an NT transmission device (hereinafter referred to as an NT station) 11 located at a subscriber (NT) side and an LT transmission device (hereinafter referred to as an LT office) 12 located at a exchange office (LT) side are connected by means of a transmission line 13 via an interface, the transmission line 13 enabling two-way transmissions. The transmission device 12 at the LT side is connected to a subscriber line exchange 12a, which transmits users' data (B, D and M respectively denote channels) between users in the two ways. More particularly, information having a bit rate of 160 kbps is transferred between the NT station 11 and the LT office 12 via the transmission line 13.

The NT station 11 and the LT office 12, which perform the two-way transmission, carry out, for the purpose of line equalization and echo cancellation, training in advance of reception and transmission.

FIG. 2 is a block of the stations shown in FIG. 1. In FIG. 2, a transmission/reception part 11A at the NT side and a transmission/reception part 12A at the LT side are the same as each other. Transmission data is sent to an echo canceller (EC) 22 and an encoder (ENC) 23 via a transmitter (Tx) 21.

The echo canceller (EC) 22 generates an echo replica of echo of the near-end transmission, and the echo replica is eliminated from the transmission signal at a subtracter 24. Data encoded by the encoder (ENC) 23 is transmitted to the transmission line 13 via a hybrid circuit (H) 25. The hybrid circuit (H) 25 is a circuit establishes an interface between a subscriber line (two wires) and a transmitter/receiver part (four wires), and establishes impedance matching (line equalization) by a balancer (B) 25a.

An analog input signal that is input from the transmission line 13 is sent to the subtracter 24 via the hybrid circuit (H) 25. The echo of the near-end transmission is separated from the input signal at the subtracter 24, and is sent to a receiver 26. In this manner, received data is extracted. The subtracter 24 functions to eliminate the transmit data from the input signal because the two-way communications take place via the transmission line 13 and the echo of the near-end transmission is included in the input signal via the hybrid circuit 25.

The input signal transmitted via the hybrid circuit 25 is sent to a tone signal detection circuit (TD) 27, which detects a tone signal contained in the input signal. The detected tone signal is used for training which is performed at the previous stage of actual data communications.

FIG. 3 is a block diagram of the tone signal detection circuit shown in FIG. 2. In FIG. 3, the tone signal detection circuit 27 an A/D converter 31 for converting an analog input signal into a digital signal, a band-pass filter (BPF) 32 for extracting signals having necessary frequency components, and a level (power) detector 33 for detecting the level (or power) of the signal from the band-pass filter 32.

In practice, the A/D converter 31 of the tone signal detection circuit needs two operational amplifiers, two comparators, and a digital circuit having 1500 gates if the tone signal consists of 14 bits and has a speed of 80 kbauds (kHz). Further, the BPF 32 and the level (power) detector 33 need 1000 gates or more.

FIG. 3 shows the case where the analog input signal is converted into the digital signal. In a case where the tone signal is detected from the analog input signal rather than the digital signal, the A/D converter 31 is not needed, and the BPF 32 and the level (power) detector 33 are analog circuits made up of a large number of comparators and so on.

The above-mentioned digital subscriber line transmission system is configured in conformity to a U. S. standard (ANSI: American National Standards Institute). This U.S. standard standardizes an interface required to perform communications between stations and networks in a digital subscriber line transmission system.

According to the above U.S. standard, a code transmitted via the transmission lines is a 2B1Q code, which is a PAM (Pulse Amplitude Modulation) code having amplitudes of four values and no redundancy.

FIG. 4 is a diagram for explaining the 2B1Q code. As shown in FIG. 4, the 2B1Q code is such that two bits are represented by 4-nary symbols (+3, +1, −1, −3).

FIG. 5 shows an example of a training sequence, and FIG. 6 shows an example of the tone signal.

Referring to FIG. 5, a tone signal TL for training equal to two frames (240 symbols) is transmitted from the LT (office) side shown in part (a) of FIG. 5, and a training tone signal TN for training equal to four frames (480 symbols) is transmitted from the NT (subscriber) side shown in part (b) thereof. That is, a period (4 msec or less) for receiving the tone signal TL for training is provided at the NT (subscriber) side shown in the part (b), the tone signal TN is transmitted upon receipt of the tone signal TL. The training is sent to the NT (subscriber) side after the tone signal TN is received and detected at the LT (office) side.

As shown in FIG. 6, the tone signal is a signal of 10 kHz which is repeated with a period of eight symbols (+3, +3, +3, +3, −3, −3, −3, −3) of 80 k-baud. By sending the tone signal to the other device, the respective devices are informed of the starting of training by each other. In the modems and so on, a sinusoidal wave signal is used as the tone signal.

Normally, supplying of power to parts that are not needed to operate when the training is started before a communication takes place is interrupted in order to reduce power consumed in the digital subscriber line transmission devices.

However, it is impossible to interrupt supplying of power to a circuit for detecting the tone signal because such a circuit is needed to start the training. Furthermore, the tone signal detection circuit 27 shown in FIGS. 2 and 3 needs a large number of circuit parts even when the circuit 27 is of analog type or digital type. As a result, the circuit 27 is very complex and consumes a large quantity of power.

DISCLOSURE OF THE INVENTION

An object of the present invention is to provide a signal detection circuit that has a simple structure without a filter and consumes a decreased quantity of power.

The above object of the present invention is achieved by a signal detection circuit comprising: A/D conversion means (42) for converting an analog signal having a periodicity into one-bit digital signals; serial-to-parallel converting means

(43) for converting the one-bit digital signals into parallel signals of a predetermined number of bits by using a clock signal having a frequency equal to at least twice that of a detection object signal, the predetermined number of bits corresponding to a number of bits of the detection object signal; correlation means (45) for detecting a correlation between the parallel signals and a reference signal string indicating a signal component of the detection object signal; and hold means (48) for holding a state of detection of the correlation when an output signal of the correlation means (45) becomes indicative of the state of detection of the correlation at least one time in a period of the detection object signal.

BRIEF DESCRIPTION OF THE DRAWINGS

FIG. 1 is a diagram of the structure of a conventional digital subscriber line transmission system;

FIG. 2 is a block diagram of stations shown in FIG. 1;

FIG. 12 is a diagram for explaining a correlation device having another structure.

THE BEST MODE OF CARRYING OUT THE INVENTION

Figure 7:
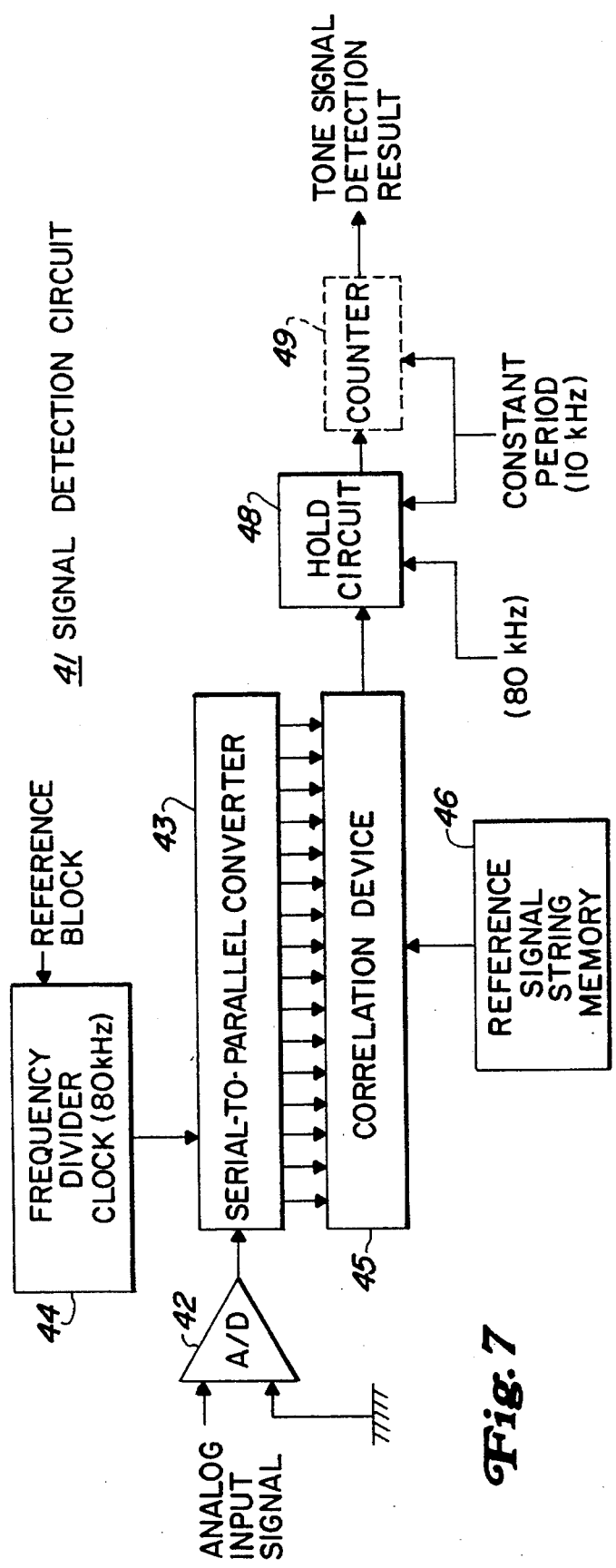
FIG. 7 is a block diagram of the principle of an embodiment of the present invention.

FIG. 7 is a block diagram of the principle of the present invention. In a signal detection circuit 41 shown in FIG. 7, an analog input signal having periodicity is input to an A/D (analog-to-digital) converter 42 formed with a comparator. A tone signal is detected from the analog signal.

An output signal of the A/D converter 42 is input to a serial-to-parallel converter 43. A clock of 80 kHz obtained by dividing a frequency clock 44 is applied to the serial-to-parallel converter 43.

An output signal of the serial-to-parallel converter 43 is input to a correlation device, the above output signal consisting of a predetermined number of bits in parallel. Further, the correlation device 45 is supplied with a reference signal string $b_n$ (for example, $b_{1n}-b_{sn}$) stored in a memory 46.

An output signal of the correlation device 45 is input to a hold circuit 48, which is supplied with the clock (for example, 80 kHz) from the frequency divider 44 and a clock (for example, 10 kHz) with a constant period obtained by dividing the clock from the frequency divider 44.

A signal corresponding to the result of detection of the tone signal is output from the hold circuit 48.

In the signal detection circuit 41 as described above, the analog input signal is converted into a one-bit digital signal by the A/D converter 42.

The output signal of the A/D converter 42 is applied to the serial-to-parallel converter 43, which converts parallel signals of a predetermined number of bits corresponding to the number of bits of a detection object signal. The A/D converter 42 has a conversion period determined by a clock signal (80 kHz for the tone signal) which has a speed faster (normally n times where n is an integer greater than or equal to 2) than the speed of the detection object signal, such as the tone signal. Hence, the output signal of the A/D converter 42 is sampled by a clock (80 kHz) having the same period as that of the above clock and is input to the serial-to-parallel converter 43.

The parallel signals of the predetermined number of bits converted at the serial-to-parallel converter 43 are sent to the correlation device 45, which detects a correlation between the reference signal string $b_n$ from the memory 46, the reference signal string $b_n$ indicating the signal component of the detection object signal. When the correlation is detected by the correlation device 45 at least one time in the period of the detection object signal (a period of 1/10 kHz for the tone signal: see FIG. 6), the hold circuit 48 holds the detection of the correlation, which indicates the detection of the tone signal.

The detecting operation can be simplified in such a manner that the reference signal string $b_n$ consists of a plurality of signal strings taking into account an erroneous decision (which will be described later) in the A/D converter 42 and the correlation detector 45 detects a match with one of the plurality of signal strings.

Further, as indicated by a broken line, a counter 49 functioning as a counting means is provided at the stage subsequent to the hold circuit 48. The counter 49 increases the count value in response to the output signal of the hold circuit 48, and generates a signal indicative of the detection of the tone signal that is the detection object matter when the count value becomes equal to a constant count value. That is, the counter 49 plays a role of a detection protection stage, and makes it possible to more precisely perform the detecting operation.

When the predetermined number of bits handled in the serial-to-parallel converter 43 and the correlation device 45 is set to n times (n is an integer larger to or equal to 2) the number of bits of the tone signal which is the detection object signal, it is possible to prevent the reference signal string from coinciding with a signal string other than the detection object signal and to more precisely realize the signal detection.

Figure 8:
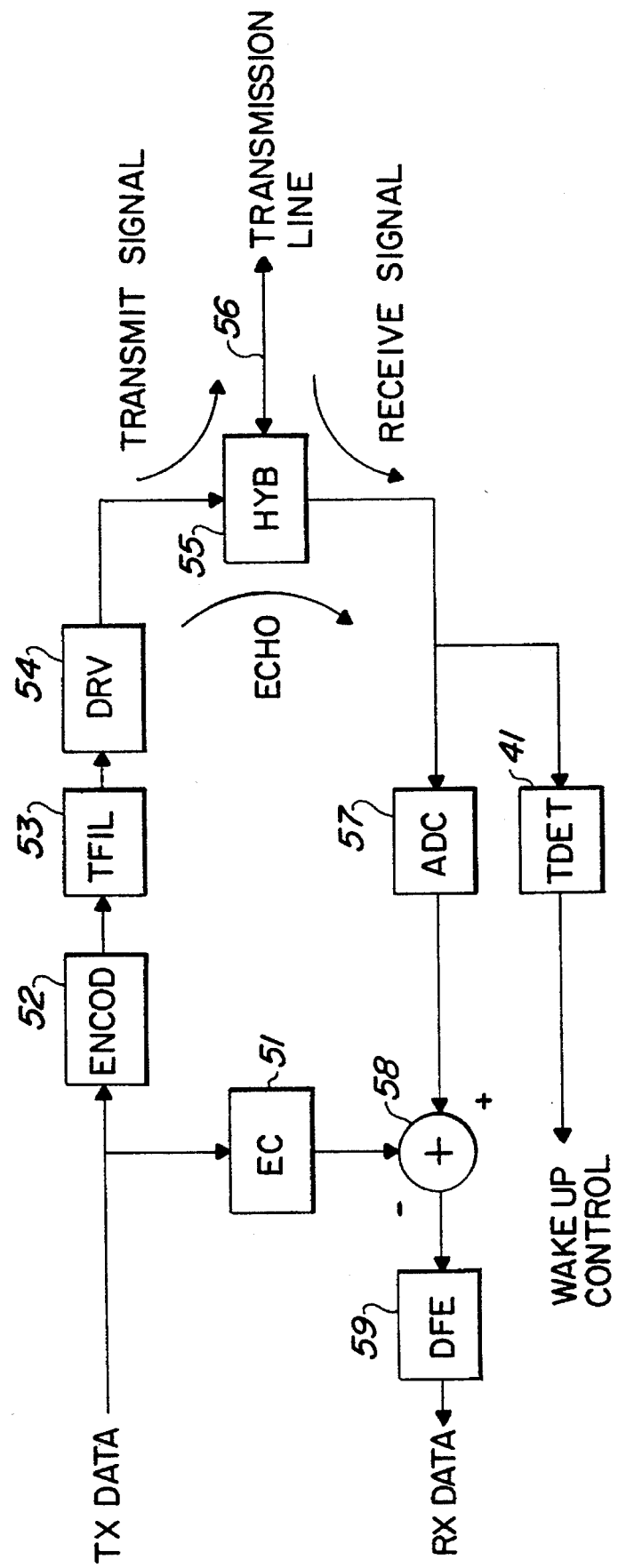
FIG. 8 is a diagram of a system to which the present invention is applied.

FIG. 8 shows the structure of a system to which the present invention is applied. The whole system to which the present invention is applied is almost the same as shown in FIGS. 1 and 2. FIG. 8 shows a block structure of an NT station (an LT office is configured in the same manner) in detail.

Referring to FIG. 8, transmit data (Tx DATA) from a transmitter (see FIG. 2) is input to the echo canceller (EC) 51 and the encoder (ENCOD) 52. The coded output signal from the encoder (ENCOD) 52 passes through a transmission filter (TFIL) 53, and is input to a line driver (DRV) 54. An output signal of the line driver (DRV) 54 is carried, as a transmit signal (TRANSMIT SIGNAL), on a transmission line TRANSMISSION LINE) 56 via a hybrid circuit (HYB) 55 establishing an interface between a subscriber line (two wires) and a transmitter/receiver part (four wires).

An analog receive signal (RECEIVE SIGNAL) transmitted via the transmission line 56 is input to an A/D converter 57 via the hybrid circuit (HYB) 55, and to the signal detection circuit (TDET) 41. A digital signal derived from the analog input signal by the A/D converter (ADC) 57 is input to a subtracter 58. The digital signal includes an echo signal (ECHO) of transmit data generated in the station that receives the above analog receive signal, such an echo signal being superimposed on the received signal from the hybrid circuit (HYB) 55.

The subtracter 58 subtracts a transmission echo replica from the digital output signal from the A/D converter (ADC) 57, so that the echo of the transmit signal is eliminated therefrom. Hence, the subtracter 58 outputs the digitized real receive input signal, which is sent, as receive data (RX DATA), to the receiver (see FIG. 2) via an equalizer (DFE) 59.

The receive signal (RECEIVE SIGNAL) sent from the hybrid circuit (HYB) 55 is input to the signal detection circuit 41, which detects the tone signal that is the detection object signal contained in the input signal. When the tone signal is detected, the signal detection circuit 41 outputs a detection signal (WAKE UP CONTROL), which activates the structural parts.

Figure 9:
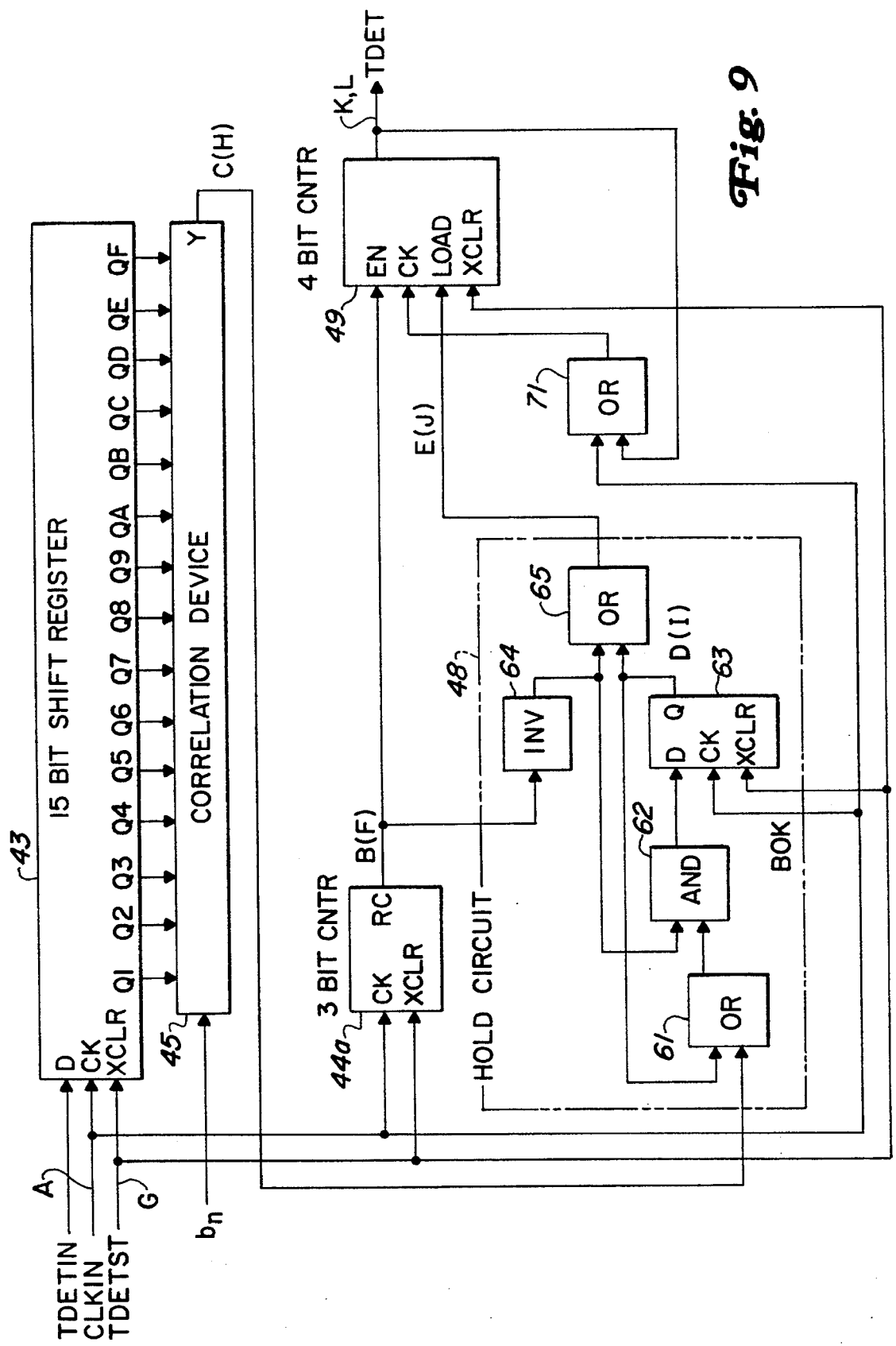
FIG. 9 is a circuit block diagram of a concrete example of the structure shown in FIG. 7.

FIG. 9 is a circuit block diagram of the concrete example shown in FIG. 7. In FIG. 9, the serial-to-parallel converter 43 is formed with a 15-bit shift register. A one-bit signal (TDET IN) is applied to a data terminal (D) of the shift register 43, and a clock (CLK IN) of 80 kHz from the frequency divider 44 is input to a clock terminal (CK). The frequency, 80 kHz is determined so as to be eight times the frequency of the 10 kHz tone.

A detection operation indication signal (TDET ST) used to switch the operation algorithms of the echo canceller 51 and the equalizer 59 is input to a clear terminal (XCLR) of the shift register 43. The detection operation indication signal (TDET ST) is used to perform power-on reset and reset the tone signal detection circuit for initialization allowed to wait for a next communication after the present communication terminates. When the reset is released, the corresponding parts are caused to operate. The 15-bit parallel signals are output to the correlation device 45 via output terminals (Q1–Q9, QA–QF) of the shift register 43.

The correlation device 45 is further supplied with the reference signal string $b_n$ (which will be described later), and an output signal from an output terminal Y is input to the hold circuit 48.

The hold circuit 48 is made up of OR circuits 61 and 65, an AND circuit 62, a D-type flip-flop 63, and an inverter circuit 64. The output signal of the correlation device 45 is input to the OR circuit 61. The 80 kHz clock signal (CLK IN) is applied to a clock terminal (CL) of the D-type flip-flop 63, and the detection operation indication signal (TDET ST) is applied to a clear terminal (XCLR) thereof. An output signal from an output terminal Q of the D-type flip-flop 63 is applied to the OR circuits 61 and 65.

An output signal of the OR circuit 61 is input to the AND circuit 62, and an output signal of the AND circuit 62 is input to a D terminal of the D-type flip-flop 63. An output signal of the inverter circuit 64 is input to the AND circuit 62 and the OR circuit 65.

The clock signal (CLK IN) and the detection operation indication signal (TDET ST) are respectively applied to a clock terminal (CK) and a clear terminal (XCLR) of a three-bit counter 44a. A 10 kHz clock is output, via an output terminal (RC) of the counter 44a, to the inverter circuit 64, and an enable terminal (EN) of the four-bit counter 49.

The 80 kHz clock signal (CLK IN) is input to an OR circuit 71, and the detection operation indication signal (TDET ST) is input to a clear terminal (XCLR) of the counter 49.

The output signal of the OR circuit 65 of the hold circuit 48 is applied to a load terminal (LOAD) of the counter 49, and the output signal of the OR circuit 71 is applied to a clock terminal (CK) thereof. An output signal from an output terminal (RC) of the counter 49 is input to the OR circuit 71, and is output, as the tone signal detection result (TSET).

That is, the hold circuit 48 holds "1" (or "0") until the next period when the output signal of the correlation device becomes "1" ( or "0") at least one time within the 10 kHz period. The three-bit counter 44a generates a pulse "1" (or "0") every 10 kHz. The four-bit counter 49 loads "0" when the output signal of the hold circuit 48 is equal to "0", and outputs "1" via the RC terminal when the counter value becomes "15".

The reference signal string $b_n$ will now be described. The reference signal string $b_n$, supplied from the memory 46 (in this case, the latch 47 is not needed), is as follows with respect to a 16-bit signal string $\{a_n\}$ consecutively output from the shift register 43 with a frequency of 80 kHz (n=k–k+15);

$\{b_n\}$=1,1,1,1,0,0,0,1,1,1,1,0,0,0,0

Figure 3:
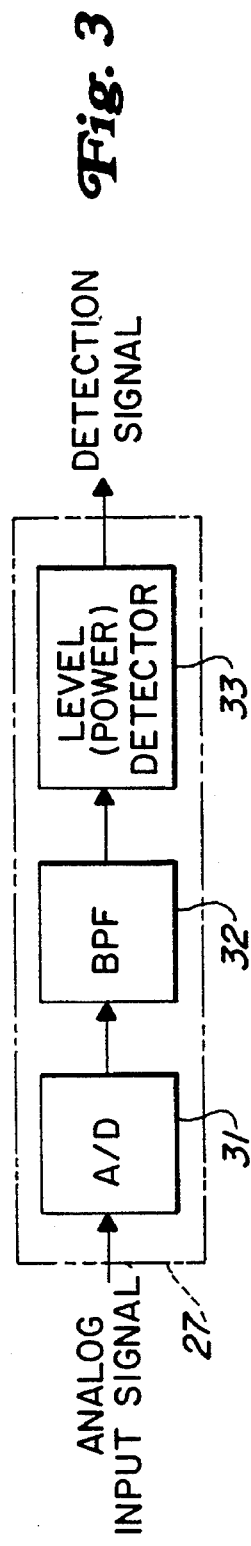
FIG. 3 is a block diagram of a tone signal detection circuit shown in FIG. 2.
Figure 4:
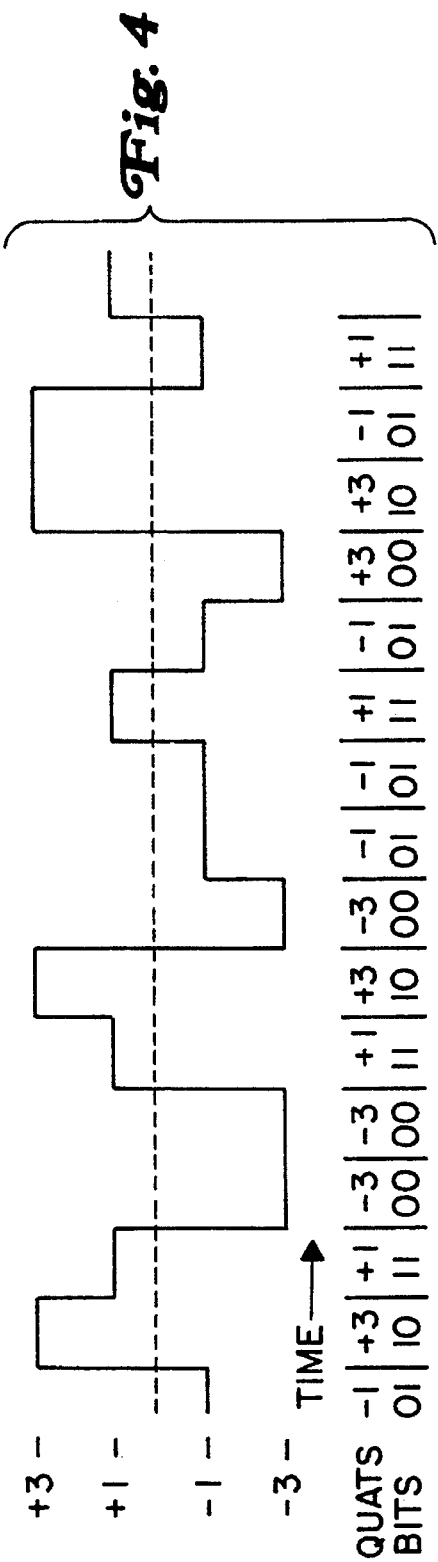
FIG. 4 is a diagram for explaining a 2B1Q code.
Figure 5A:
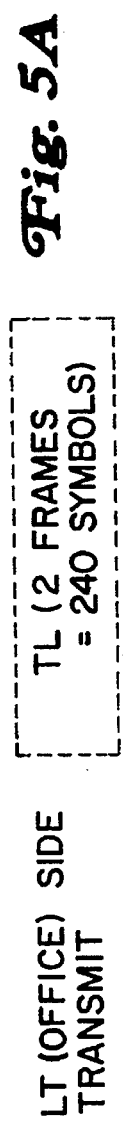
FIG. 5 is a diagram of an example of a training sequence using a tone signal.
Figure 5B:
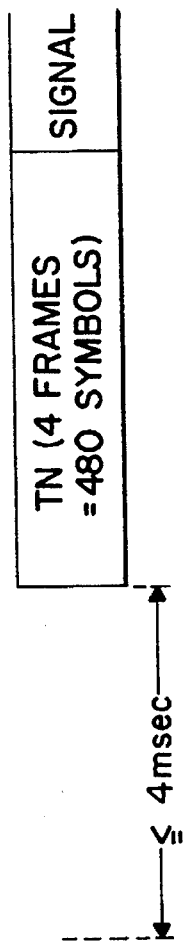
Figure 6:
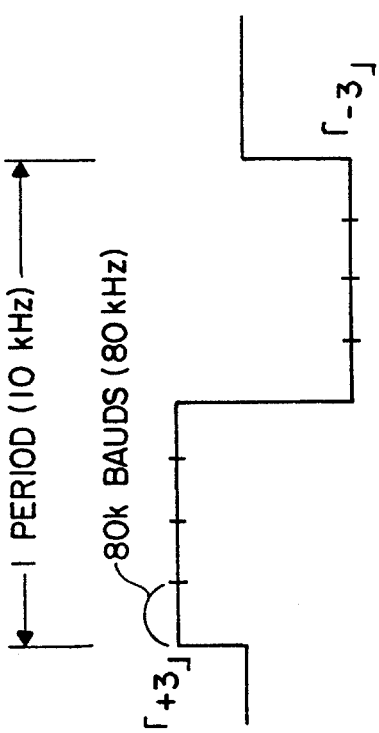
FIG. 6 is a diagram of an example of the tone signal.

The tone signal that is the detection object signal has a minimum unit of eight bits, {1,1,1,1,0,0,0,0}, as shown in FIG. 6. The reason why the 16-bit tone signal is used is that, even with ½ (5 kHz) the frequency of the tone signal (10 kHz), a signal string of {1,1,1,1,0,0,0,0} appears at four bits before a bit change from "1" to "0" in a string of {1,1,1,1, 0,0,0,0,1,1,1,1,0,0,0,0} and four bits after the above bit change.

It is preferable that the reference signal string $\{b_n\}$ used to detect the correlation has one of bit sequences taking into account an offset of the comparator 1 and an erroneous decision made by the comparator due to noise when a change from "1" to "0" or "0" to "1" occurs:

$\{b_{1n}\}$={1,1,1,X,0,0,0,X,1,1,1,X,0,0,0,X}

$\{b_{2n}\}$=1,1,X,0,0,0,0,X,1,1,X,0,0,0,0,X}

$\{b_{3n}\}$={1,X,0,0,0,0,0,0, X1,X,0,0,0,0,0,X}

$\{b_{4n}\}$={1,1,1,1,X,0,0,X,1,1,1,1,X,0,0,X}

$\{b_{5n}\}$={1,1,1,1,1,X,0,X,1,1,1,1,1,X,0,X} where "X" a bit ignored (don't care). When all the bits except for bits X match the detection object signal, it is determined that the reference signal string $\{b_n\}$ has been detected. Hence, it is enough to form the shift register 43 with a 15-bit shift register. The reference signal strings $b_{1n}$–$b_{5n}$ are supplied to the correlation device 45 from the memory 46.

Figure 10A:
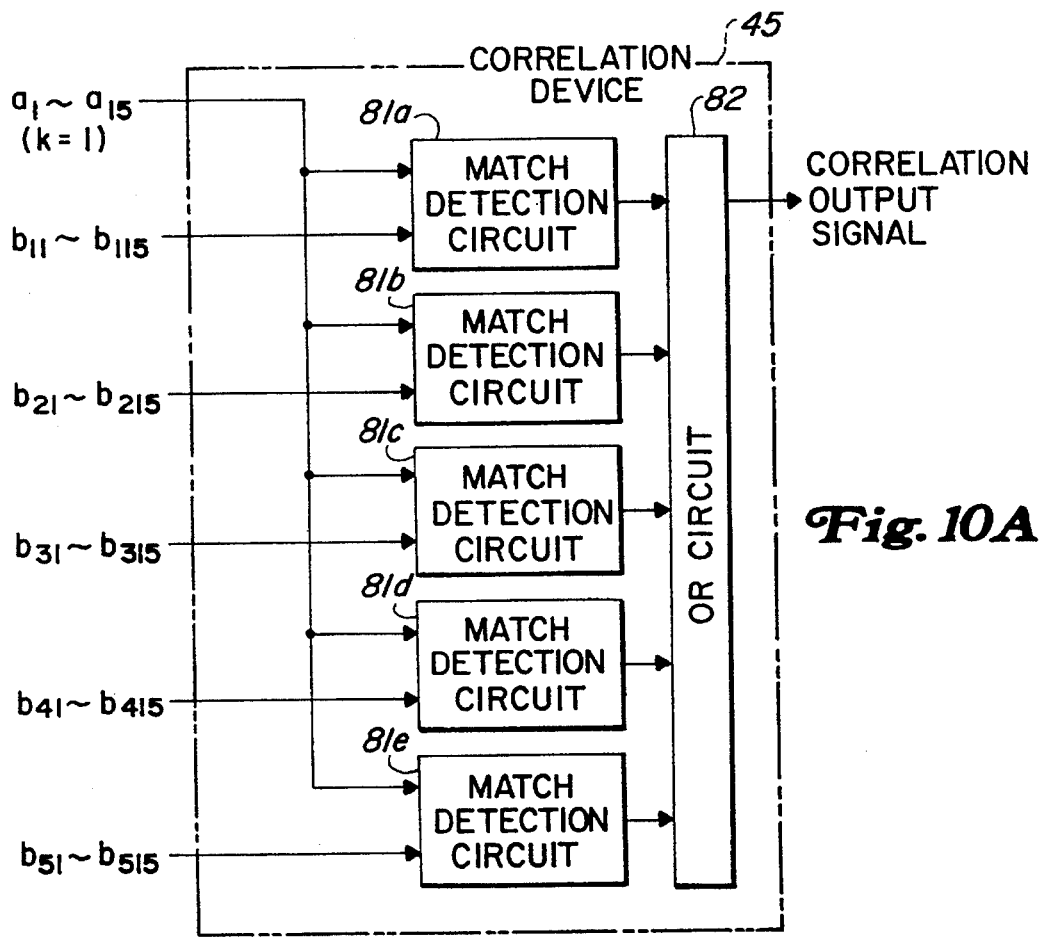
FIGS. 10A and 10B are block diagrams of a correlation device.
Figure 10B:
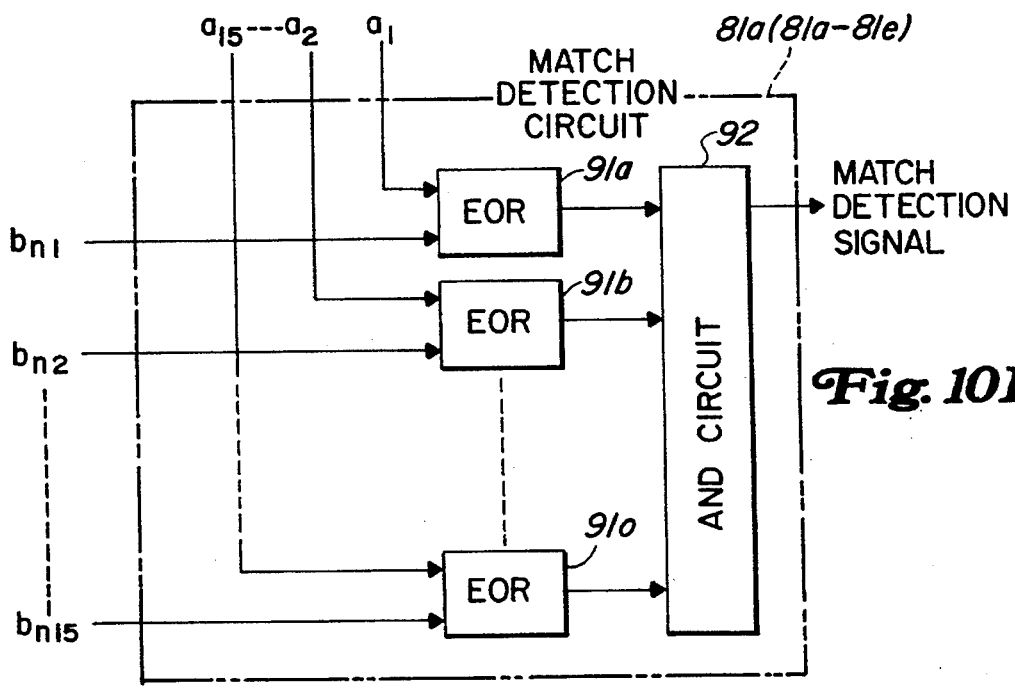

FIGS. 10A and 10B are block diagrams of the correlation device shown in FIG. 9. In FIG. 10A, the correlation device 45 is made up of, for example, five match detection circuits 81a–81e, and an OR circuit 82 performing a logic OR operation on the output signals of the five match detection circuits.

The output signal strings $a_1$–$a_{15}$ (k=1 in n=k—k+15 of the aforementioned $a_n$) are input to input terminals of the match detection circuits 81a–81e. Further, reference signal strings $b_{11}$–$b_{115}$ ($b_{n1}$–$b_{n15}$:n=1–5) among the aforementioned reference signal strings $b_n$ are input to other input signals of the match detection circuit 81a. Similarly, $b_{21}$–$b_{215}$, $b_{31}$–$b_{315}$, $b_{41}b_{415}$ and $b_{51}$–$b_{515}$ are respectively input to the match detection circuits 81b–81e.

The output signals of the match detection circuits 81a–81e are input to the OR circuit 82, and the output signal of the OR circuit 82 is output via the Y terminal as a correlation output signal. That is, in the match detection circuits 81a–81e, the correlations between the output signals $a_1$–$a_{15}$ from the shift register 43 and the reference signal strings are checked, and the correlation output signal is output when one of the correlations is detected.

As shown in FIG. 10B, each of the match detection circuits 81a–81e is made up of 15 EOR (exclusive-OR) circuits 91a–91o, and an AND circuit 92. Input terminals of the EOR circuits 91a–91o are supplied with the output signals $a_1$–$a_{15}$ of the shift register 43, and other input signals of the EOR circuits 91a–91o are supplied with the reference signal strings $b_{n1}$–$bn_{15}$. Output signals of the EOR circuits 91a–91o are input to the AND circuit 92. That is, the match detection signal from the AND circuit 92 is output to the OR circuit 82 shown in FIG. 10A when the output signals of all the EOR circuits 91a–91o become "1".

As shown in FIGS. 9, 10A and 10B, the signal detection circuit of the present invention can be formed with 200 through 300 gates and is much simpler than the conventional circuit formed with 10000 gates or more.

Figure 11:
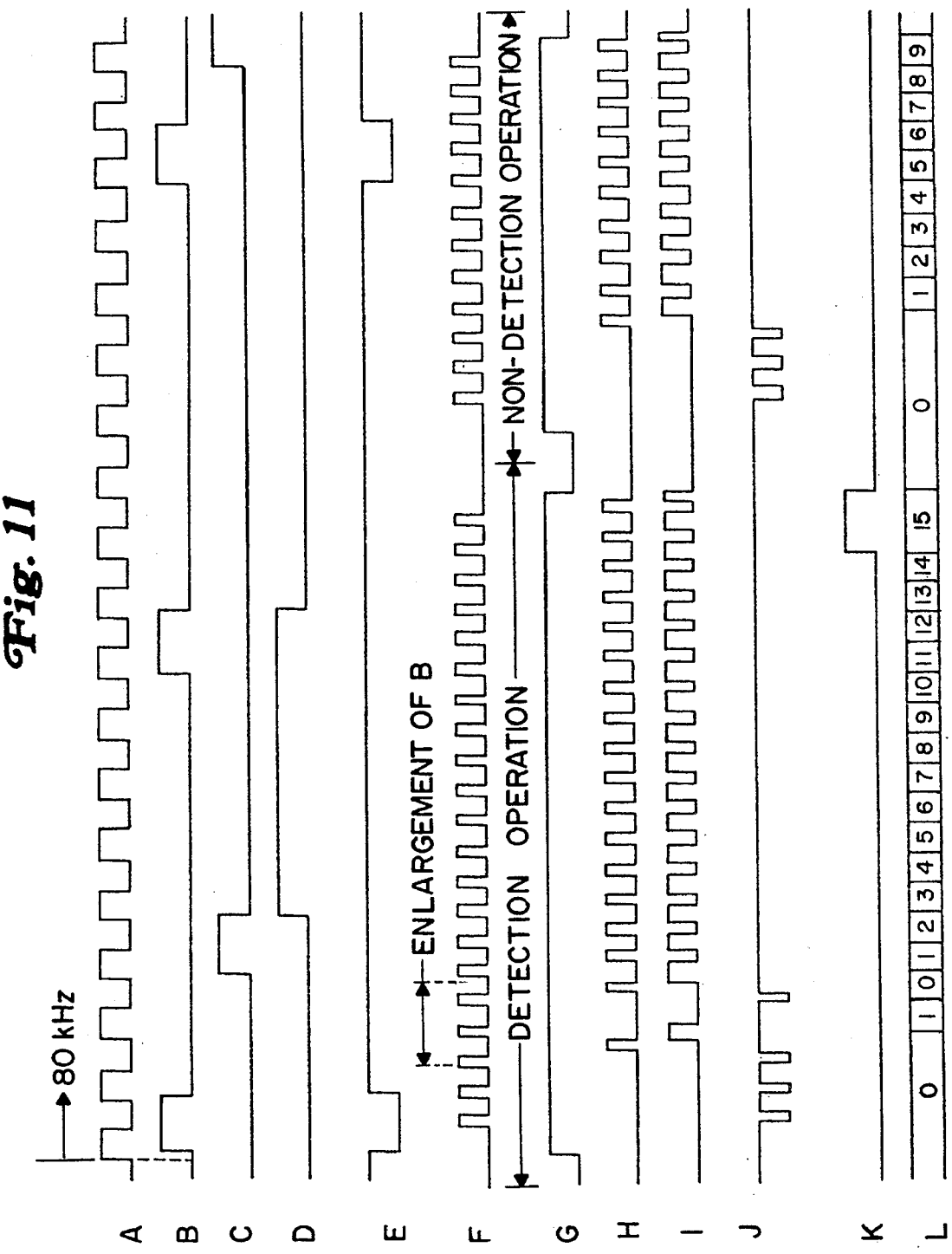
FIG. 11 is a time chart of the operation of the structure shown in FIG. 9.

FIG. 11 is a time chart of the operation of the structure shown in FIG. 9. In FIG. 11, A–E indicate tone signal detections when the counter 49 is not used, and F–L indicate tone signal detections when the counter 49 is used.

The 10 kHz signal (FIG. 11B) is generated by the counter 44a using the clock CLKIN of 80 kHz (FIG. 11A). When the output signal Y is output by the correlation device 45 (FIG. 11C), a signal is output from the Q terminal of the D-type flip-flop 63 of the hold circuit 48 in synchronism with the fall edge of the output signal Y. The output signal from the Q terminal is reset and falls in synchronism with the fall edge of the 10 kHz output signal from the counter 44a (FIG. 11D). Hence, the signal indicative of the tone signal detection is output from the OR circuit 65.

When the counter 49 is used, the 10 kHz clock (an enlarged illustration of FIG. 11B) is output by the counter 44a (FIG. 11F). In this case, the detection operation and the non-detection operation are repeatedly performed every 10 kHz, and a detection operation indication signal TDETST is output during the detection operation (FIG. 11G). The frequency 10 kHz is a monitoring period.

When the correlation is detected by the correlation device 45, the output signal Y is output (FIG. 11H), and the output signal is output via the Q terminal of the D-type flip-flop in synchronism with the fall edge of the output signal Y (FIG. 11I). An output signal is output from the OR circuit 65 (FIG. 11J), and is input to the counter 49.

When the output signal of the OR circuit 65 is "0", the counter 49 loads it and starts the count operation. When the count value becomes 15 (FIG. 11L), "1" is output from the RC time (FIG. 11K). The output signal obtained at that time is input to the OR circuit 71, and an output signal thereof resets the count value of the counter 49.

In becomes possible to reduce erroneous operation (erroneous detection) when the state in which the correlation is detected continues and hence it is finally determined when the tone signal is detected in the case where the count value of the counter 49 becomes 15. As shown in FIG. 7, the tone signal consists of 240 or 480 symbols. For 240 symbols, 240/8 =30, which is large enough to reach the count value "15".

FIG. 12 is a diagram for explaining another structure of the correlation device. The correlation device 45 shown in FIG. 9 is configured by the combination of the AND circuit (AND operation) and the OR circuits (OR operation), and the logical structure of the correlation device 45 is illustrated in shown in FIG. 12.

In the correlation device 45 shown in FIG. 12, signals A1–A5 are generated by the logical AND operation on the output signals Q1–Q7 from the shift register 43, and signals B1–B5 are generated by the logical OR operation on the output signals of the output signals Q9 and QA–AF. The output signal of the correlation device 45 is output via the Y terminal by calculating the logical OR operation of the results of the logical AND operations, A1·B1, A1·B2, A2·B1, A2·B2, A2·B3, A3·B2, A3·B3, A3·B4, A4·B3, A4·B4, A4·B5, A5·B4, A5·B5.

That is, the correlation device 45 is logically configured without inputting the reference signal string. With this structure, it becomes possible to omit the memory and to use a simpler circuit structure.

As described above, it is possible to detect the object signal by means of a simple circuit structure of low power consumption without a complex analog or digital filter of large power consumption by converting an analog input signal having a periodicity, such as a tone signal, into one-bit digital signals, converting these one-bit digitals into parallel signals of bits equal in number to the bits of a detection object signal, detecting a correlation between the parallel signals and a reference signal string indicating signal components of the detection object signal, and holding a correlation detection state when the correlation is detected at least one time in the constant period of the detection object signal.

It will be noted that a synchronizing system made up of a serial-to-parallel converter such as a shift register, and a comparator is described in, for example, Japanese Laid Open Patent Application Nos. 61-256262, 62-36971, 57-171862, 58-88982, 62-230133, 63-169847, 63-284940, 55-95449, and 4-141770.

However, these devices perform signal processing by synchronizing an input signal and a reference signal with each other. On the other hand, the present invention is directed to detecting an object signal such as a tone signal from an analog input signal having a periodicity in a communications system, and is characterized in that the circuit structure is made much simpler than the prior art structure.

INDUSTRIAL AVAILABILITY

As has been described, according to the present invention, it becomes possible to detect an object signal by a simple detection circuit of low power consumption without a complex analog or digital filter of large power consumption.

We claim:

1. A signal detection circuit comprising:

A/D conversion means for converting an analog signal having a periodicity into one-bit digital signals;

serial-to-parallel converting means for converting the one-bit digital signals into parallel signals of a predetermined number of bits by using a clock signal having a frequency equal to at least twice that of a detection object signal, the predetermined number of bits corresponding to a number of bits of the detection object signal;

correlation means for detecting a correlation between the parallel signals and a reference signal string indicating a signal component of the detection object signal; and hold means for holding a state of detection of the correlation when an output signal of the correlation means becomes indicative of the state of detection of the correlation at least one time in a period of the detection object signal.

2. The signal detection circuit as claimed in claim 1, wherein the reference signal string includes a plurality of signal strings taking into account an erroneous decision in the A/D conversion means, and the correlation means detects a match with one of the plurality of signal strings.

3. The signal detection circuit as claimed in claim 2, wherein the correlation means is configured to generate the reference signal string.

4. The signal detection circuit as claimed in claim 2, wherein the correlation means is configured to accept the reference signal string as an input from an external source.

5. The signal detection circuit as claimed in claim 1, further comprising count means for counting a count value on the basis of an output signal of the hold means and for generating a signal indicative of detection of the detection object signal when the count value becomes equal to a predetermined count value.

6. The signal detection circuit as claimed in claim 1, wherein the predetermined number of bits is n times the number of bits of the detection object signal (n is an integer larger than or equal to 2).

7. The signal detection circuit as claimed in claim 1, wherein the detection object signal is a tone signal corresponding to a communication starting condition.

* * * * *